US008489639B2

(12) United States Patent  
Yeh et al.

(10) Patent No.: US 8,489,639 B2  
(45) Date of Patent: Jul. 16, 2013

(54) INFORMATION SOURCE ALIGNMENT

(75) Inventors: Peter Yeh, San Jose, CA (US); Prateek Jain, Dayton, OH (US); Kunal Verma, Sunnyvale, CA (US); Reymonrod G. Vasquez, San Jose, CA (US)

(73) Assignee: Accenture Global Services Limited, Dublin (IE)

( * ) Notice: Subject to any disclaimer, the term of this patent is extended or adjusted under 35 U.S.C. 154(b) by 152 days.

(21) Appl. No.: 13/041,193

(22) Filed: Mar. 4, 2011

(65) Prior Publication Data

US 2012/0226716 A1    Sep. 6, 2012

(51) Int. Cl.
G06F 15/16 (2006.01)
G06F 17/20 (2006.01)

(52) U.S. Cl.
USPC .......................................... 707/791; 707/797

(58) Field of Classification Search
USPC ................................................. 707/797, 791
See application file for complete search history.

(56) References Cited

U.S. PATENT DOCUMENTS

| 7,293,010 | B2 | 11/2007 | Angele et al. | |
| 2006/0106832 | A1* | 5/2006 | Ben-Dyke et al. | 707/100 |
| 2006/0167872 | A1* | 7/2006 | Parikh | 707/6 |
| 2007/0150443 | A1* | 6/2007 | Bergholz et al. | 707/3 |
| 2007/0150495 | A1* | 6/2007 | Koizumi et al. | 707/100 |

OTHER PUBLICATIONS

Sabou, Marta, et al., Exploring the Semantic Web as Background Knowledge for Ontology Matching; Knowledge Media Institute (KMi), UK, 2006.

Bizer, Christian, et al., Linked data—the story so far; International Journal on Semantic Web and Information Systems 5(3), 2009, 1-22.
Jain, Prateek, et al., Linked Data is Merely More Data; AAAI Press Menlo Park, CA; 2010, 82-86.
Jain, Prateek, et al., Ontology Alignment for Linked Open Data; ISWC, Nov. 7-11, 2010, 402-417.
Parundekar, Rahul, et al., Linking and building ontologies of linked data; ISWC2010, Nov. 2010.
Damova, Mariana, Mapping the Central LOD Ontologies to PROTON Upper-Level Ontology; CEUR Workshop Proceedings, Nov. 2010.
Giunchiglia, Fausto, et al., S-Match: an open source framework for matching lightweight ontologies; 2011.
David, Jérôme, et al., Matching directories and OWL ontologies with AROMA; CIKM '06, 2006, 830-831.
Li, Juanzi, et al., RiMOM: A Dynamic Multistrategy Ontology Alignment Framework; 2009, 1218-1232.
Mascardi, Viviana, et al., Automatic Ontology Matching via Upper Ontologies: A Systematic Evaluation; 2010, 609-623.
Fellbaum, Christiane, WordNet: An Electronic lexical database; the MIT Press, 1998.

(Continued)

*Primary Examiner* — John Breene
*Assistant Examiner* — Alex Gofman
(74) *Attorney, Agent, or Firm* — Mannava & Kang, P.C.

(57) ABSTRACT

An information source alignment system may include a tree generation module executed by a computer system to generate a source category hierarchy tree for a source class in a first information source and a target category hierarchy tree for a target class in a second information source. The source and target category hierarchy trees may be constructed from a class hierarchy of a knowledge source. A class-similarity determination module may compare the source and target category hierarchy trees. An alignment module may determine whether the source and target classes are aligned based on the comparison of the source and target category hierarchy trees.

17 Claims, 8 Drawing Sheets

OTHER PUBLICATIONS

Baker, Collin F, et al., The Berkeley FrameNet Project; ACL-36, Morristown, JN, USA, 1998, 86-90.

Cornet, Ronald, et al., Forty years of SNOMED: a literature review; BMC medical informatics and decision making 8 Suppl 1, 2008.

Terziev, I., et al., Base upper-level ontology (bulo) Guidance; vol. 1, Ontotext Lab, Sirma Group, 2004.

Euzenat, Jérôme, et al., Matching ontologies for context; 2007.

Euzenat, Jérôme, et al., Ontology Matching; 2007.

Choi, Namyoun, et al., A Survey on Ontology Mapping; Drexel University, 2006, 34-41.

Ponzetto, Simone P., et al., Deriving a Large Scale Taxonomy from Wikipedia; AAAI Press, 2007, 1440-1445.

Ponzetto, Simone P., et al., Large-Scale TAXONOMY Mapping for Restructuring and Integrating Wikipedia; Jul. 11-17, 2009, 2083-2088.

Nikolov, Andriy, et al., Overcoming Schema Heterogeneity Between Linked Semantic Repositories to Improve Coreference Resolution, ASWC 2009, Dec. 6-9, 2009, 332-346.

Alexander, Keith, et al., Describing Linked Datasets—On the Design and Usage of VoiD, the "Vocabulary of Interlinked Datasets"; In: WWW2009 Workshop on Linked Data on the Web (LDOW20090), Madrid, Spain; 2009.

Volz, Julius, et al., Discovering and Maintaining Links on the Web of Data; In: ISWC '09: Proceedings of the 8th International Semantic Web Conference; Berlin, Heidelberg; 2009, 650-665.

Bergman, M.K., Giasson, F.: UMBEL ontology, vol. 1, technical documentation. Available from: http://umbel.org/doc/UMBELOntology vA1.pdf. Aug. 2008.

\* cited by examiner

INFORMATION SOURCE ALIGNMENT

BACKGROUND

Information sources may include a variety of structured or unstructured information. An ontology is a type of information source that includes a formal representation of knowledge, which may include a set of concepts within a domain and relationships that exist between those concepts. Ontologies may span diverse fields such as science, history, medicine, geography, etc., without limitation. Examples of ontologies include the DBPEDIA, FREEBASE and GEONAMES ontologies in the Linked Open Data (LOD) cloud, which has presented major advances towards realizing the Semantic Web vision.

Ontologies may be used by applications, such as robust Question Answering (QA) systems, that require many different sources of information. In many instances, these applications attempt to align multiple ontologies to create a large information base. However, often, the alignment of the ontologies is inaccurate and manually intensive. For example, the ontologies may include classes. Alignment of the ontologies may include attempting to correlate the classes in the ontologies with each other. Typically, database experts or knowledge engineers may subjectively view the classes and attempt to correlate them with each other. This process becomes infeasible with ontologies that may be comprised of hundreds or even thousands of classes. Furthermore, subjective alignment may result in inaccurate alignment of classes, which may cause inaccurate or substandard query results.

SUMMARY

In an embodiment, an information source alignment system may include a tree generation module executed by a computer system to generate a source category hierarchy tree for a source class in a first information source and a target category hierarchy tree for a target class in a second information source. The source and target category hierarchy trees may be constructed from a class hierarchy of a knowledge source. A class-similarity determination module may compare the source and target category hierarchy trees. An alignment module may determine whether the source and target classes are aligned based on the comparison of the source and target category hierarchy trees.

In an embodiment, an information source alignment system may include a computerized contextual-similarity determination module comparing a source class from a first information source to a target class from a second information source by determining a similarity between superclasses of the source and target classes. The superclasses may be ascertained from the respective first and second information sources. An alignment module may determine whether the source and target classes are aligned based on the determined similarity.

In an embodiment, a method for information source alignment may include generating, by a computer, a source category hierarchy tree for a source class in a first information source and a target category hierarchy tree for a target class in a second information source. The source and target category hierarchy trees may be constructed from a class hierarchy of a knowledge source. The method may include determining a similarity between the source and target classes by comparing the source and target category hierarchy trees. The method may further include determining an alignment between the source and target classes based on the comparison of the source and target category hierarchy trees.

In an embodiment, for a non-transitory computer readable medium having stored thereon a computer executable program to perform information source alignment, the computer executable program when executed may cause a computer system to generate, by the computer, a source category hierarchy tree for a source class in a first information source and a target category hierarchy tree for a target class in a second information source. The source and target category hierarchy trees may be constructed from a class hierarchy of a knowledge source. The computer executable program when executed may cause the computer system to determine a similarity between the source and target classes by comparing the source and target category hierarchy trees, and determine an alignment between the source and target classes based on the comparison of the source and target category hierarchy trees.

BRIEF DESCRIPTION OF DRAWINGS

The embodiments are described with reference to the following figures.

DETAILED DESCRIPTION OF EMBODIMENTS

Figure 1:
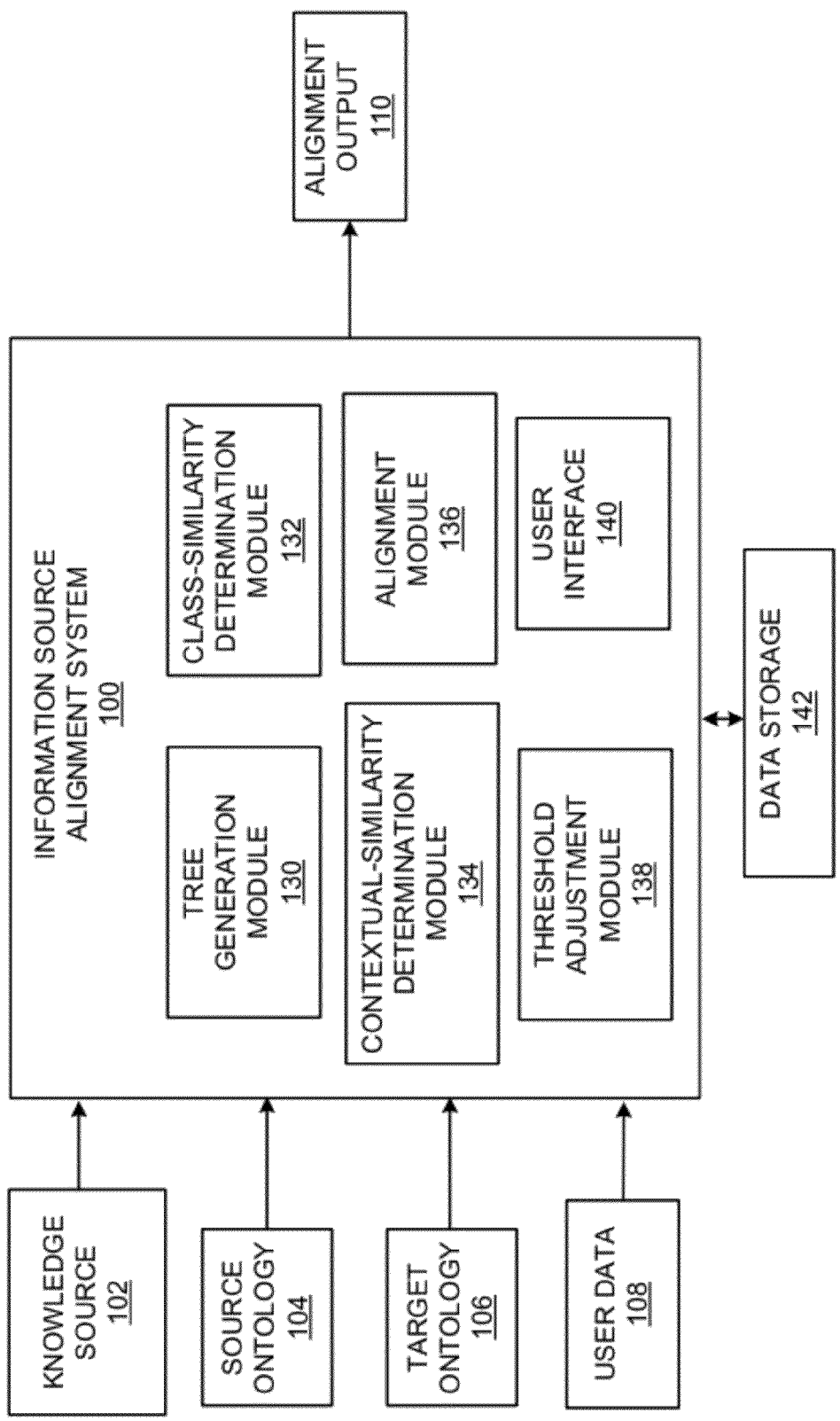
FIG. 1 illustrates a system diagram for an information source alignment system, according to an embodiment.

For simplicity and illustrative purposes, the principles of the embodiments are described by referring mainly to examples thereof. In the following description, numerous specific details are set forth in order to provide a thorough understanding of the embodiments. It will be apparent that the embodiments may be practiced without limitation to all the specific details. Also, the embodiments may be used together in various combinations.

1. Overview

An information source alignment system 100 provides for automatic determination and alignment of information sources, such as ontologies. The system 100 also provides schema-level alignment of ontologies, databases, or any information generally from an information source.

As described in detail below, an ontology may be comprised of a hierarchy of classes. The ontology may have a schema that describes its hierarchical structure, which describes the levels and classes in the levels. The system 100 may perform schema-level linking to align multiple ontologies. This linking may include determining which classes between two ontologies to align and account for contextual information to further support or reject an alignment.

With regard to class alignment, the system 100 may compute the similarity between source and target classes based on category hierarchy trees, which are described below. The terms source and target are used to distinguish between two ontologies or to distinguish between classes in each of the ontologies. The system 100 may also account for the importance of common nodes between the category hierarchy trees of the two classes, and may account for bias against large category hierarchy trees. With regard to contextual similarity, the system 100 may evaluate superclasses of the two classes from their respective ontologies to determine whether the classes should be aligned. In addition, the system 100 may also use contextual information from a knowledge source and the ontologies being aligned (the knowledge source may be an external knowledge source). Through testing, it has been determined that the system 100 provides for accurate schema-level alignment of information sources, such as ontologies, based on the class and contextual similarity. The system 100 also provides for accurate alignment of databases and any structured information generally based on the class and contextual similarity.

The system 100 may be used to align ontologies for a variety of different applications. In an embodiment, the system 100 may be used to align two or more databases. For example, a database administrator may be faced with the task of combining two databases, which may include different fields that cover the same or similar subject matter, such as an Employee_ID field in database 1 and a User_ID field in database 2. The system 100 may identify fields that are the same or similar. These fields and their data may be combined under one field so the new database does not include redundant fields.

The systems and methods described herein provide a technical solution to the technical problem of aligning multiple ontologies or other information sources to create a large information base. In many instances, manual creation of schema-level mappings across ontologies for determining alignment is not a viable solution given the size of the ontologies and the rate of growth of the ontologies. The systems and methods according to the embodiments provide the technical solution of aligning large ontologies using metrics to determine which classes between two ontologies to align, and may consider contextual information to further support (or reject) an alignment.

2. System

FIG. 1 illustrates an information source alignment system 100, according to an embodiment. The system 100 may be used to perform schema-level alignment of ontologies, or alignment of databases or any information generally from an information source. The system 100 may also be used for querying of ontologies, databases or other sources of information. Examples of applications of the system 100 are described with respect to alignment of LOD cloud ontologies and organization databases, but may also be extended to any ontologies, databases, or structured information generally.

The system 100 may include a tree generation module 130, a class-similarity determination module 132, a contextual-similarity module 134, an alignment module 136, a threshold adjustment module 138 and a user interface 140. The modules and other components of the system 100 may include software, hardware or a combination of software and hardware. The system 100 may include a data storage 142 that may store any information utilized by the system 100. The data storage 142 may include a database or other type of data management system.

As shown in FIG. 1, the system 100 may receive a knowledge source 102, a source ontology 104, a target ontology 106 and user data 108. Alternatively, as described above, the system 100 may receive the knowledge source 102, first and second information sources (or databases) instead of the source and target ontologies, and the user data 108. The user data 108 may include information related to ontologies 104, 106, threshold levels, and other information as described below. The knowledge source 102 may include an existing set of data describing interrelationships between terms or concepts. The knowledge source 102 may be organized as a hierarchy with classes in multiple levels. Classes may be related as subclasses or superclasses. For example, a superclass is a class with one or more subclasses that are children to the superclass in a lower level. The ontologies may have similar structures. An example of the knowledge source 102 is a resource description framework (RDF) version of WIKIPEDIA that is available on the Internet and which includes a hierarchical structure of classes. The knowledge source 102, source ontology 104, target ontology 106 and user data 108 may be used by the system 100 to determine ontology alignment output 110, which includes class alignments and other information as is further described below.

Construction of an ontology alignment forest will now be described with reference to FIGS. 1, 2(A) and 2(B). The source ontology 104 and the target ontology 106 may each include multiple classes. The source classes are referred to as source class-C, and the target classes are each referred to as target class-D.

The tree generation module 130 may construct a set of source category hierarchy trees-$T_i$, denoting a source ontology alignment forest-$F_C$, for each source class-C. Likewise, the tree generation module 130 may construct a set of target category hierarchy trees-$T_j$, denoting a target ontology alignment forest-$F_D$, for each target class-D. For each source class-C and target class-D, the tree generation module 130 may respectively tokenize and stem the names of the source class-C and target class-D, and remove stop words from the names. The module 130 may use the resulting terms as a search string to retrieve relevant pages from the knowledge source 102.

Figure 2A:
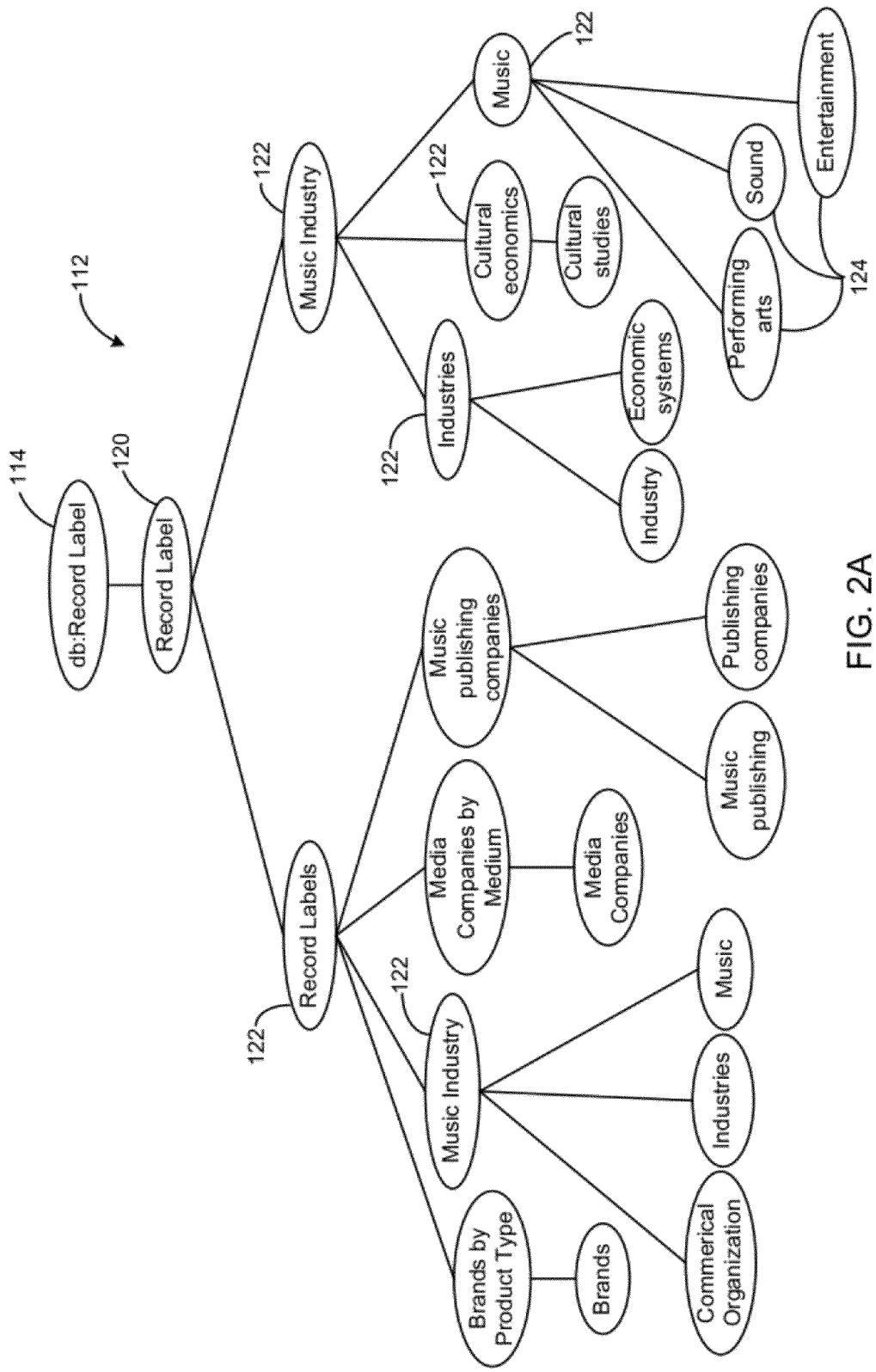
FIGS. 2(A) and 2(B) illustrate category hierarchy tree structures for the information source alignment system, according to an embodiment.
Figure 2B:
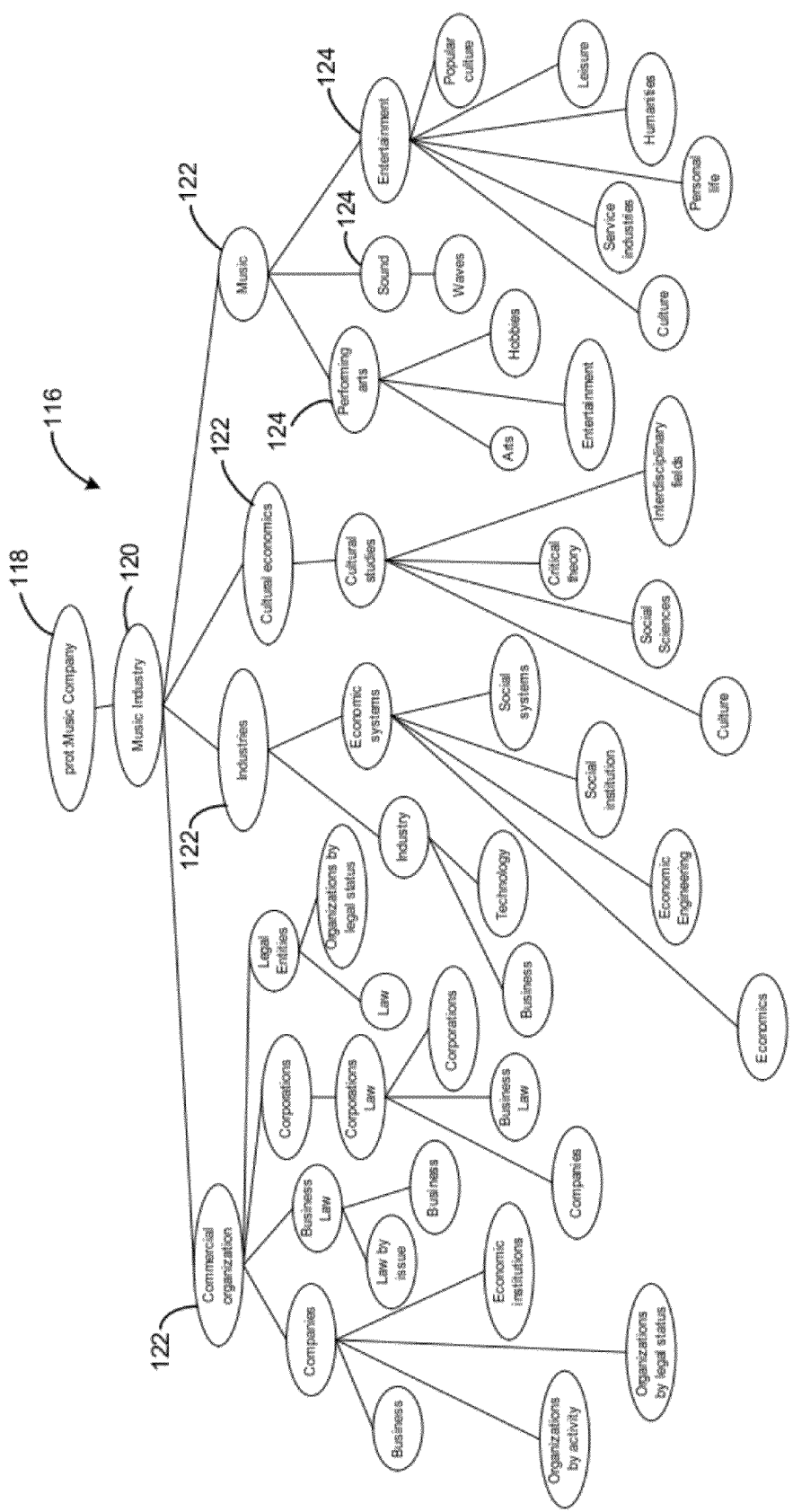

FIGS. 2(A) and 2(B) show examples utilizing categories in the WIKIPEDIA knowledge source to determine a source category hierarchy tree 112 and a target category hierarchy tree 116. For example, RecordLabel shown in FIG. 2(A) is a source class 114 from the source ontology 104, and Music-Company shown in FIG. 2(B) is a target class 118 from the target ontology 106. The source class 114 may be used to identify one or more senses-$s_i$ from WIKIPEDIA. For example, WIKIPEDIA may be searched with the search term RecordLabel. WIKIPEDIA articles in the search results may form the senses-$s_i$. In each of the WIKIPEDIA articles, one or more categories and/or subcategories may be identified from the hierarchy of the WIKIPEDIA knowledge source. In the example in FIG. 2(A), a sense 120 for RecordLabel 114 is the article Record Label identified from a WIKIPEDIA page identified from the search results.

Thus for the source category hierarchy tree-$T_i$, the module 130 may treat each page as the possible sense-$s_i$ of the source class-C and construct the tree-$T_i$ for the possible sense-$s_i$ as follows:

1. The root of the source category hierarchy tree-$T_i$ is the possible sense-$s_i$. In FIG. 2(A), for the source class RecordLabel, only one sense-$s_i$ is shown for illustrative purposes. If the source class RecordLabel includes additional senses-$s_i$, such senses-$s_i$ would generate additional source category hierarchy trees-$T_i$.

2. The immediate children 122 of the sense-$s_i$ are all WIKIPEDIA categories 124 that the possible sense-$s_i$ belongs to.

3. Each subsequent level may include all unique, direct super categories of the categories at the current level. For the target category hierarchy tree 116 shown in FIG. 2(B), the module 130 may construct the tree 116 in a similar manner.

The module 130 may impose a limit on the depth of the source and target category hierarchy trees-$T_i$ and $T_j$ being constructed, and in the example of FIGS. 2(A) and 2(B), this limit may be imposed at four levels. The resulting tree may then be added to the source and target ontology alignment forests-$F_C$ and $F_D$.

As described above, examples of a source category hierarchy tree-$T_i$ for the source class RecordLabel from the DBPEDIA ontology (FIG. 2(A)), and a target category hierarchy tree-$T_j$ for the target class MusicCompany from the PROTON ontology (FIG. 2(B)) are illustrated. In order to generate the tree 112 of FIG. 2(A), for the source class RecordLabel, a WIKIPEDIA search reveals the categories "Record labels" and "Music industry" placed at level two of the tree 112, with the related WIKIPEDIA article Record Label being placed at level one. For the level two category "Music industry" the level three categories include "Industries", "Cultural economics" and "Music". For these level three categories, as shown in FIG. 2(A), the level four categories for "Industries" include "Industry" and "Economic systems." The level four category for "Cultural economics" includes "Cultural studies". The level four categories for "Music" include "Performing arts", "Sound" and "Entertainment". In this manner, the source category hierarchy tree-$T_i$ and the target category hierarchy tree-$T_j$ can be generated.

Computation of class similarity will now be described with reference to FIGS. 1, 2(A) and 2(B), and Table I.

The class-similarity determination module 132 may compare each source class-C in the source ontology 104 with each target class-D in the target ontology 106 to determine similarity between the two classes. This may be done by comparing each source category hierarchy tree-$T_i$ in the source ontology alignment forest-$F_C$ for the source class-C with each target category hierarchy tree-$T_j$ in the target ontology alignment forest-$F_D$ for the target class-D (e.g. $T_i \epsilon F_C$ with each $T_j \epsilon F_D$). For each source category hierarchy tree-$T_i$, the module 132 may determine any overlap with the target category hierarchy tree-$T_j$.

Referring to Table I, common nodes between the trees 112 and 116 of FIGS. 2(A) and 2(B) are listed, including the depth of the nodes. In Table I, the first column lists the common nodes between the two trees rooted at Record Label and Music Industry. The second column lists the depth (the distance from root) of these nodes in the source category hierarchy tree-$T_i$ rooted at Record Label.

TABLE I

| Common Nodes | Node Depth |
| --- | --- |
| Music industry | 1 |
| Music; Industries; Cultural economics | 2 |
| Industry; Other special topics (economics); Cultural studies; Economic systems; Entertainment; Performing arts; Sound | 3 |

As shown in Table I, at level two in the source category hierarchy tree 112 rooted at Record Label, the common node with the target category hierarchy tree 116 is Music industry. Similarly, at level three in the tree 112 rooted at Record Label, the common nodes with the tree 116 are Music, Industries and Cultural economics. The level four categories in the tree 112 rooted at Record Label can be similarly evaluated.

Referring to FIGS. 2(A) and 2(B) and Table I, common nodes that appear deeper in the trees 112 or 116 may be more generic, and thus less discriminative. Such nodes may appear in many trees 112 or 116, which can result in false alignments. Further, large trees-$T_i$ or $T_j$ can be penalized as such trees would need to have more nodes in common with another tree in order to have a high similarity score, thus resulting in bias against large trees when computing the overlap.

To address the foregoing considerations, the module 132 may compute the overlap between two trees-$T_i$ or $T_j$, and hence the similarity of their corresponding classes using the following Equation (1):

$$\mathrm{Overlap}(T_i, T_j) = \frac{\log \sum_{n \in T_i \cap T_j} (1 + e^{d(n)^{-1} - 1})}{\log 2 |T_i|} \quad (1)$$

where $n \epsilon T_i \cap T_j$ are the common nodes between the source category hierarchy tree-$T_i$ and target category hierarchy tree-$T_j$, and $d(n)$ is the depth of a common node-n in the source category hierarchy tree-$T_i$. By taking the exponentiation of the inverse depth of a common node, less importance may be given to a generic node, and the log of the tree size may minimize bias against large trees. Equation (1) ranges from 0.0 to 1.0, where 0.0 indicates no similarity and 1.0 indicates maximum similarity. The output of Equation (1) may be a class-similarity value, such that the alignment module 136 aligns the source class-C to the target class-D if the class-similarity value exceeds a predetermined class-similarity value threshold. For the example of FIGS. 2(A) and 2(B), application of Equation (1) for determining class similarity between the source class RecordLabel from the DBPEDIA ontology and the target class MusicCompany from the PROTON ontology results in an Overlap ($T_i$, $T_j$) of 0.79. Assuming, for example, that the predetermined class-similarity value threshold is set at 0.70, the alignment module 136 thus aligns the source class RecordLabel to the target class MusicCompany.

Computation of contextual similarity will now be described with reference to FIGS. 1, 2(A) and 2(B).

In order to further determine if the source class-C should be aligned with the target class-D, the contextual-similarity determination module 134 may compute the contextual similarity between the two classes. The contextual similarity may be computed based on the superclasses (e.g. parents) of classes-C and D from their respective ontologies. If these superclasses are similar, then the alignment between classes-C and D is further supported and hence given more preference. Alternatively, if these superclasses are dissimilar, then the alignment between classes-C and D is penalized.

In an example, based on class similarity, the class Jaguar might be aligned to the class Cat. However, if Jaguar has superclasses such as Car and Vehicle, and Cat has superclasses such as Feline and Mammal, then the alignment would be penalized because its contextual similarity is low.

The module 134 may implement the foregoing contextual similarity computation by performing a pairwise class comparison between the source class-C and the target class-D. In this regard, the module 134 may retrieve all superclasses of classes-C and D up to a specified level. In an embodiment, this level may be set to one higher level than the current level of classes-C and D. The two sets of superclasses will be referred to as source class superclass-N(C) and target class superclass-N(D), which are the neighborhoods of classes-C and D respectively.

For each tree pair ($T_i$, $T_j$) for the trees-$T_i$ and $T_j$, between the classes-C and D, the module 134 may determine the number of superclasses in the source and target class superclasses N(C) and N(D) that are supported by the trees-$T_i$ and $T_j$, respectively. A superclass c∈N(C) may be considered supported by the tree-$T_i$ if either of the following conditions are satisfied:

The name of c matches a node in the tree-$T_i$. This match may be defined as either a direct string match or a substring match.

The WIKIPEDIA article (or article category) corresponding to c—based on a WIKIPEDIA search web service call using the name of c—matches a node in the tree-$T_i$.

Similarly, a superclass d∈N(D) may be considered supported by tree-$T_j$ if either of the foregoing conditions are satisfied. The module 134 may compute the contextual similarity between the classes-C and D with respect to the trees-$T_i$ and $T_j$ using the harmonic mean by Equation (2) as follows:

$$CSim(T_i, T_j) = \frac{2R_C R_D}{R_C + R_D} \quad (2)$$

where $R_C$ and $R_D$ are respectively the fraction of the source and target class superclasses N(C) and N(D) supported by the trees-$T_i$ and $T_j$. For Equation (2), the harmonic mean emphasizes superclass neighborhoods that are not well supported, and hence should significantly lower the overall contextual similarity.

Referring to FIGS. 2(A) and 2(B), the contextual similarity is computed for the example of the source class RecordLabel from the DBPEDIA ontology and the target class MusicCompany from the PROTON ontology. Assuming a level of two, the neighborhood of RecordLabel includes the DBPEDIA ontology superclasses of Company and Organization (it should be noted that these superclasses are taken from the DBPEDIA ontology for RecordLabel). Since both superclasses are supported by the tree 112 for RecordLabel, $R_{RecordLabel}$ is 2/2. For example, superclass Company may be found as a part of category name Music Publishing Companies, and superclass Organization may be found in Commercial Organization. Similarly, the neighborhood of MusicCompany includes the PROTON ontology superclasses of CommercialOrganization and Organization. Since both superclasses are supported by the tree 116 for MusicCompany, $R_{MusicCompany}$ is also 2/2. For example, both Commercial Organization and Organization may be found as part of the category name Commercial Organization. Thus based on Equation (2), the overall contextual similarity is 1.0. This would imply that the module 134 would give more preference to this alignment. The output of Equation (2) may be a contextual-similarity value, such that the alignment module 136 aligns the source class 114 to the target class 118 if the contextual-similarity value exceeds a predetermined contextual-similarity value threshold. Assuming, for example, that the predetermined contextual-similarity value threshold is set at 0.70, the module 134 thus would give more preference to this alignment, and aligns the source class RecordLabel to the target class MusicCompany. The foregoing class-similarity and contextual-similarity based alignments of the source class-C to the target class-D may be used separately or in combination as described below.

Referring to the FIGS. 2(A) and 2(B) example, for a level of two, if the neighborhood of RecordLabel includes DBPEDIA ontology superclasses that are not supported by the tree 112 for RecordLabel, $R_{RecordLabel}$ would not be 2/2 as described above. For example, assuming that the neighborhood of RecordLabel includes the DBPEDIA ontology superclasses of TradeUnion and Organization, in this case, TradeUnion is not supported by the tree 112 in FIG. 2(A), whereas superclass Organization may be found in Commercial Organization. Thus, $R_{RecordLabel}$ in this case would be 1/2. Similarly, if the neighborhood of MusicCompany includes the PROTON ontology superclasses that are not supported by the tree 116 for MusicCompany, $R_{MusicCompany}$ would not be 2/2. For example, assuming that the neighborhood of MusicCompany includes the PROTON ontology superclasses of Agent and Group, in this case, both these superclasses are not supported by the tree 116 for MusicCompany. Hence, $R_{MusicCompany}$ in this case would be 0/2. Thus based on Equation (2), the overall contextual similarity is 0. This would imply that the module 134 would penalize this alignment.

Computation of overall similarity will now be described with reference to FIGS. 1, 2(A) and 2(B).

The alignment module 136 may compute the overall similarity between the source class-C and the target class-D with respect to the trees-$T_i$ and $T_j$ by taking the weighted average of the class and contextual similarities (discussed above), using Equation (3) as follows:

$$O(T_i, T_j) = \frac{\alpha \text{Overlap}(T_i, T_j) + \beta CSim(T_i, T_j)}{2} \quad (3)$$

where α and β are weights for the class and contextual similarities respectively. The module 136 may default both α and β to 1.0 to give equal importance to each component. The output of Equation (3) may be an overall-similarity value, such that the module 136 aligns the source class-C to the target class-D if the overall-similarity value exceeds a predetermined overall-similarity value threshold (e.g. alignment threshold $H_A$ as described below). If after training of the system 100 (as described below by threshold adjustment module 138 or otherwise) or from prior knowledge, the system 100 or a user determines a class or contextual similarity for two classes is irrelevant or should receive a reduced weight for the overall similarity determination, the values of α and β may be decreased as needed. For example, if the system 100 or a user knows a given ontology is inaccurate, in such a case the value of β may be reduced to limit the contextual similarity weight in the overall similarity determination.

The alignment module 136 may then select the tree pair $(T_i, T_j) \in F_C \times F_D$ with the highest overall similarity score and if this score is greater than an alignment threshold $H_A$, then the module 136 may establish a link between the source class-C and the target class-D. As described below, the alignment threshold $H_A$ may be decreased via threshold adjust module 138 to allow links with lower overall similarity scores to establish a link between the source class-C and the target class-D. Decreasing the alignment threshold $H_A$ may however result in a higher possibility of incorrect links between two classes. The type of link may be determined as follows:

If $O(T_i, T_j) = O(T_j, T_i)$, then the module 136 sets C owl: equivalentClass D. This means that the source class-C and the target class-D are the same.

If $O(T_i, T_j) < O(T_j, T_i)$, then the module 136 sets C rdfs: subClassOf D. This means that the source class-C is a subclass of the target class-D.

Otherwise, the module 136 sets D rdfs:subClassOf C. This means that the source class-C is a superclass of the target class-D.

For the foregoing analysis, if the overall similarity is below the alignment threshold $H_A$, the module 136 may inform a user of this determination.

Referring again to the FIGS. 2(A) and 2(B) example, the overall similarity score between RecordLabel and MusicCompany is 0.895 (i.e. (0.79+1.0)/2), and the module 136 will thus establish a link between these classes based on the alignment threshold $H_A$ set, for example, at 0.5. Finally, the module 136 sets RecordLabel rdfs:subClassOf MusicCompany because $O(T_{Music\ Industry}, T_{Record\ Label}) > O(T_{Record\ Label}, T_{Music\ Industry})$.

Performance of the system 100 will now be described with reference to FIGS. 1, 2(A) and 2(B), and Table II.

In order to evaluate performance of the system 100 for alignment of LOD ontologies, performance of the system 100 is compared to known manually created LOD ontology alignments. For the evaluation, performance of the system 100 is compared to manually created schema-level mappings of the DBPEDIA, FREEBASE and GEONAMES ontologies of the LOD cloud to PROTON classes. The manually created mappings are based on equivalence and subclass relationships between LOD and PROTON classes, and are based on the definition of the classes and their usage. These manually created mappings were created by Knowledge Engineers (KEs) at ONTOTEXT for FACTFORGE, which allows for SPARQL query over the LOD cloud. A total of 544 mappings were manually created from the three LOD ontologies to PROTON (373 for DBPEDIA, 21 for GEONAMES, and 150 for FREEBASE).

Examples of the foregoing manually created mappings of LOD ontologies to PROTON are shown in Table II. Mapping of the LOD ontologies using the system 100 yields the same results as the foregoing manually created mappings by the KEs.

TABLE II

| Ontology | LOD Class | PROTON Class | Relationship |
| --- | --- | --- | --- |
| DBPEDIA | RecordLabel | MusicCompany | subClassOf |
| GEONAMES | Country | Country | equivalentClassOf |
| FREEBASE | Military command | Position | subClassOf |

Specifically, referring to Table II, in order to compare performance of the system 100 to known manually created LOD ontology alignments, the system 100 is applied to each LOD-PROTON ontology pair for DBPEDIA, FREEBASE and GEONAMES for generating mappings whose overall similarity exceeds an alignment threshold of 0.85. This threshold is based on a systematic analysis of which threshold level produces the best f-measure score. An f-measure score may provide for the use of precision and recall metrics for evaluating the accuracy or correctness of an approach. Precision may be determined as the fraction of correct responses among those that are believed to belong to a relevant subset of responses. Recall may be determined as the fraction of correct responses among all responses that actually belong to the relevant subset of responses. A match of the mappings of Table II confirms that a mapping between two classes is correct if the manually created mapping by the KEs also established a mapping between these two classes using the same relationship—i.e. equivalence or subclass. Thus based on the results of Table II, mapping of the LOD ontologies for DBPEDIA, FREEBASE and GEONAMES using the system 100 yields the same results as the foregoing manually created mappings by the KEs.

An example of an application of the system 100 for an organization database will now be described with reference to FIGS. 1-5.

Figure 3:
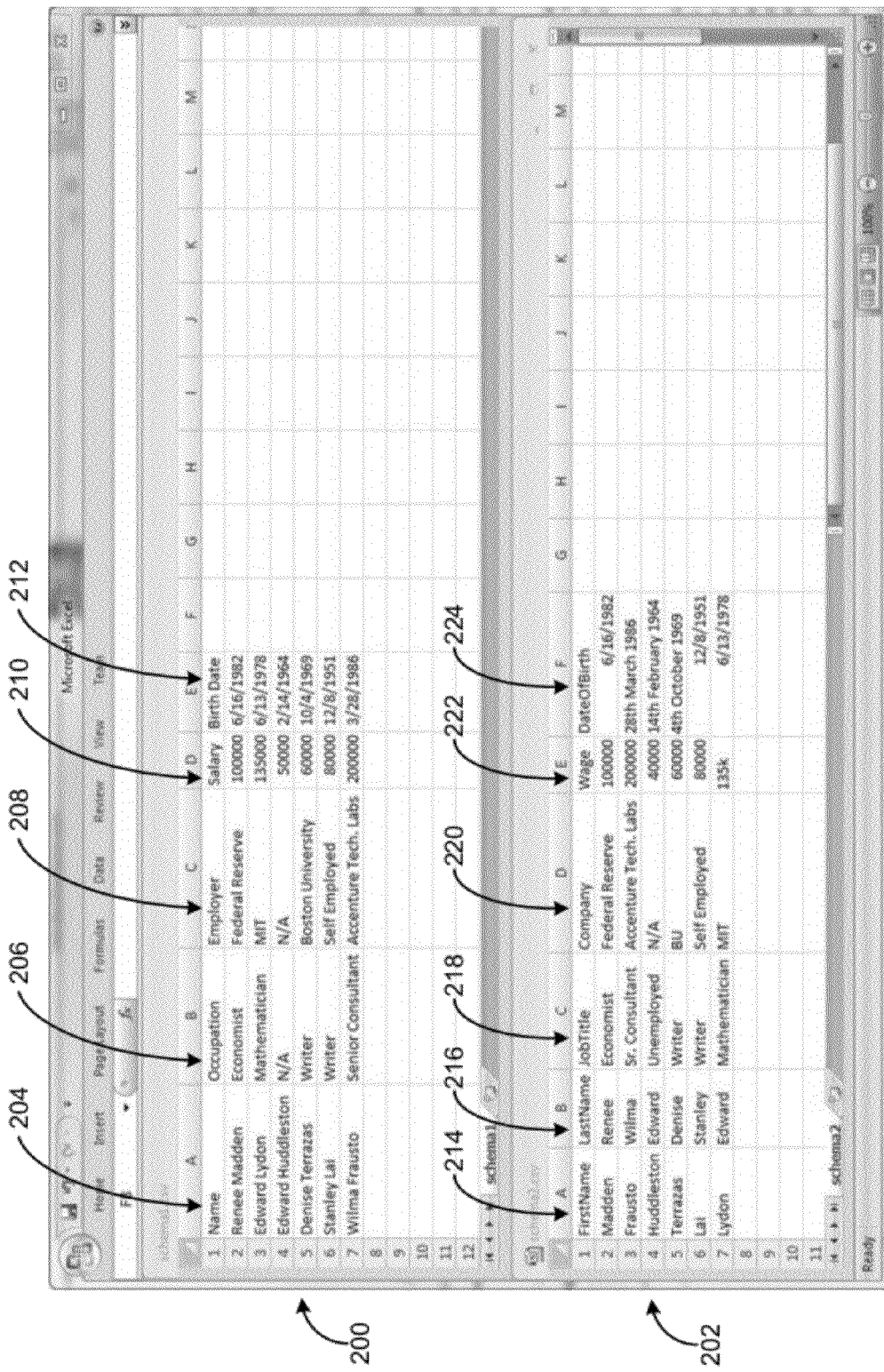
FIG. 3 illustrates organization databases, according to an embodiment.

Referring to FIG. 3, the example of database alignment may include merging of two databases, for example, a database 200 (e.g. schema 1) from a first organization and a database 202 (e.g. schema 2) from a second organization. Database 200 may include the schemas of name 204, occupation 206, employer 208, salary 210 and birthdate 212. Database 202 may include the schemas of first name 214, last name 216, job title 218, company 220, wage 222 and date of birth 224. Databases 200 and 200 may thus be linked based on the schema and not the actual content of the schemas.

Figure 4:
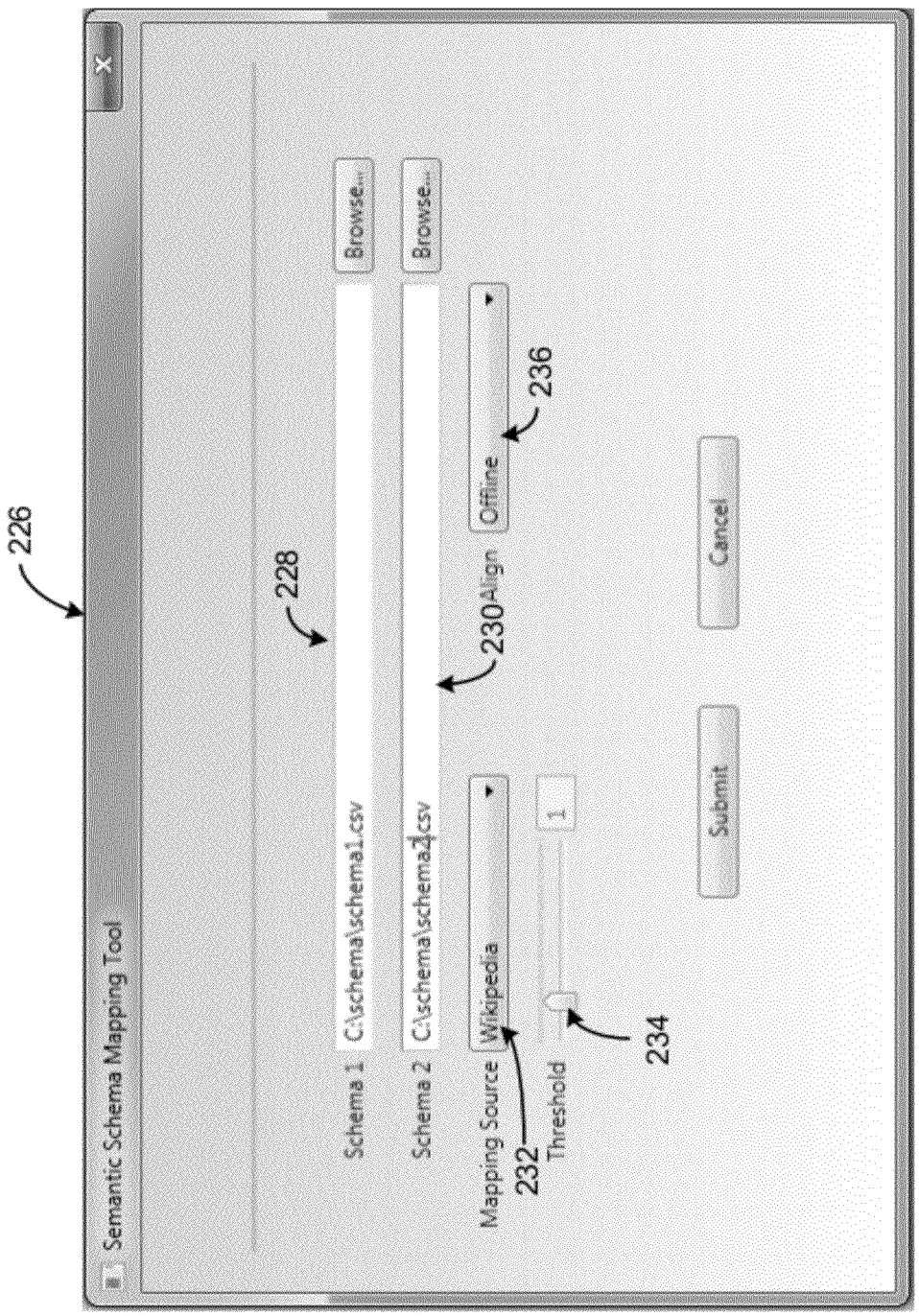
FIG. 4 illustrates a user interface for alignment of organization databases, according to an embodiment.

Referring to FIG. 4, an example of a user interface (UI) 226 for the system 100 is shown, and is similar to the user interface 140 of FIG. 1. The UI 226 may include inputs 228 and 230 indicating the two databases 200 and 202 that are to be linked. A mapping source input 232 may allow for selection of a knowledge source, which in the example of FIG. 4 is WIKIPEDIA. A threshold gauge 234 may allow for increase or decrease in the alignment threshold $H_A$. The UI 226 may also permit for online or offline evaluation at input 236. Online evaluation may be based on real-time information from the knowledge source or databases. Offline evaluation may be based on predetermined information from the knowledge source or databases. Upon selection of the foregoing inputs, a user may execute the system 100 to link the databases 200 and 202.

Figure 5:
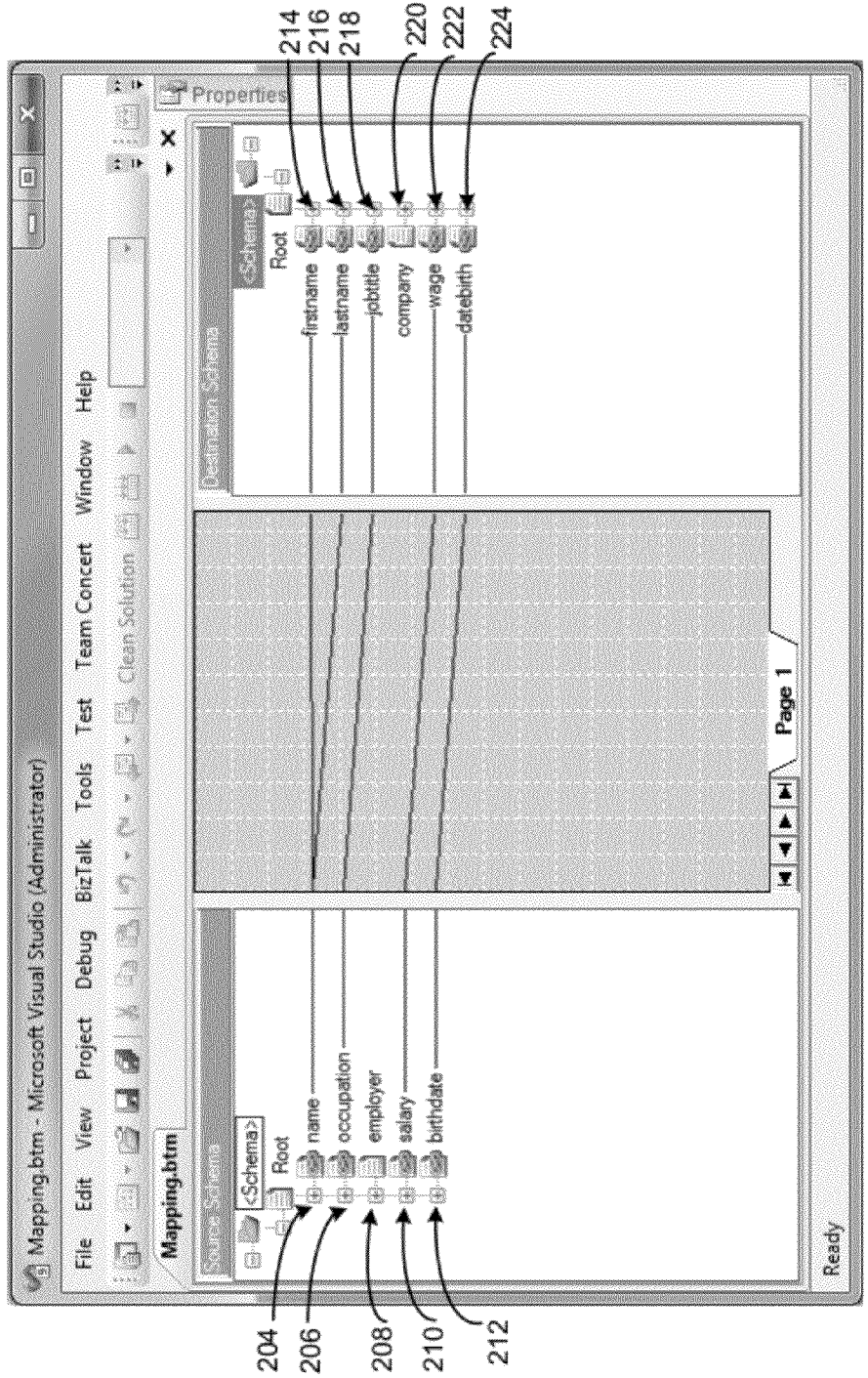
FIG. 5 illustrates alignment of organization databases, according to an embodiment.

Referring to FIG. 5, the results from execution of the system 100 are shown for linking databases 200 and 202. As shown in FIG. 5, the output 238 shows the schemas name 204, occupation 206, salary 210 and birthdate 212 of database 200 linked with the schemas of first name 214, last name 216, job title 218, wage 222 and date of birth 224. For example, the schema of name 204 for database 200 is shown linked with the schemas of first name 214 and last name 216 of database 202. Similarly, the schema of occupation 206 for database 200 is shown linked with the schema of job title 218 of database 202. Other schemas are linked as shown in FIG. 5. However, the schema of employer 208 for database 200 and company 220 for database 202 are not linked to each other or to any other schemas. A reason for this is the schemas for employer and company may be unrelated since the term employer is broad and an employer can include an organization, government entity etc. Further by decreasing the alignment threshold $H_A$, the schemas employer 208 and company 220 may be linked to each other. In this regard, the threshold adjustment module 138 may allow for a broad or individualized increase or decrease in the alignment threshold $H_A$, to allow for adjustment of links by a user.

Referring to FIG. 5, with regard to database linking or generally schema-level alignment of ontologies, or any structured information generally, the system 100 may be trained. The training may be performed by adjusting the alignment threshold $H_A$ for any missing or otherwise incorrect links. For example, for the schema of employer 208 and company 220, a user may reduce the alignment threshold $H_A$ for these two schemas such that they are linked automatically, or otherwise link the schemas manually. In this manner, the system 100 would be trained for future linking of such schemas for similar databases.

3. Method

Figure 6:
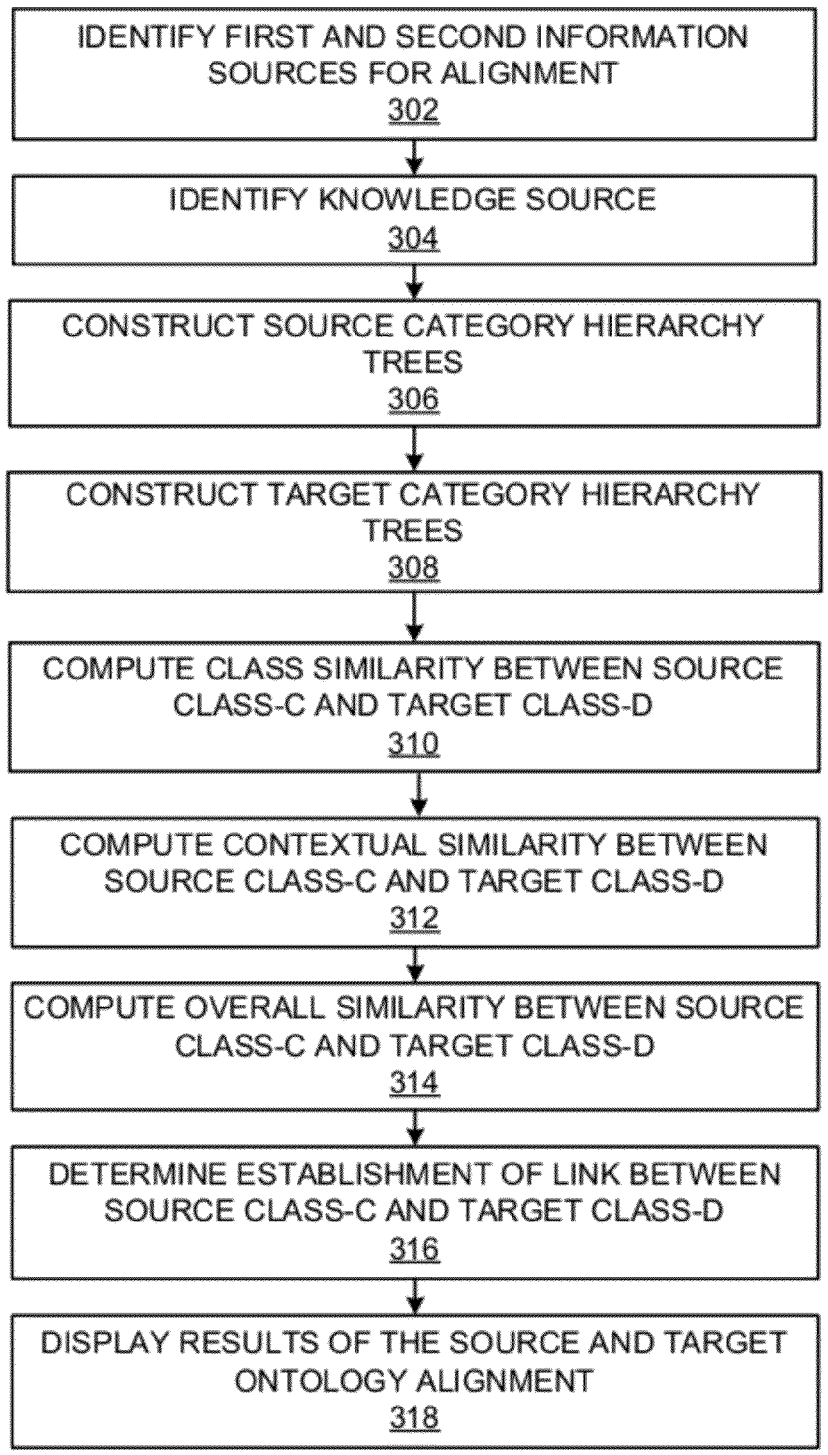
FIG. 6 illustrates a method for performing information source alignment, according to an embodiment.

FIG. 6 illustrates a flowchart of a method 300 for schema-level information source alignment, according to an embodiment. The method 300 may be implemented on information source alignment system 100 described above with reference to FIGS. 1-5 by way of example and not limitation. The method 300 may be practiced in other systems.

At block 302, the system 100 may identify first and second ontologies 104, 106, or generally, first and second information sources, databases, or any information generally for alignment. As noted herein, the first and second ontologies 104, 106 are respectively denoted source and target ontologies 104, 106. The ontologies 104, 106 may be provided by a user via user interface 140.

At block 304, the system 100 may identify the knowledge source 102 for aligning the two ontologies 104, 106. As described above, the knowledge source may be organized as a class hierarchy where links between classes in the hierarchy capture super and subclass relationships. The knowledge source may also cover a wide range of concepts and domains, to allow for broad applicability, for example, to the broad range of domains covered by the LOD cloud. In an example, the knowledge source 102 may be WIKIPEDIA.

At block 306, the tree generation module 130 may construct a set of source category hierarchy trees-$T_i$, denoting a source ontology alignment forest-$F_C$, for each source class-C from the source ontology 104. In this regard, the module 130 may use the terms in the source class-C search strings to retrieve relevant pages from the knowledge source 102. For the source category hierarchy tree-$T_i$, the module 130 may treat each page as a possible sense-$s_i$ of the source class-C and construct the tree-$T_i$ for the possible sense-$s_i$. The tree-$T_i$ may be constructed such that the root of the source category hierarchy tree-$T_i$ is the possible sense-$s_i$, the immediate children 122 of the sense-$s_i$ are all WIKIPEDIA categories 124 that the possible sense-$s_i$ belongs to, and each subsequent level may include all unique, direct super categories of the categories at the current level.

At block 308, the system 100 may construct a set of target category hierarchy trees-$T_j$, denoting a target ontology alignment forest-$F_D$, for each target class-D from the target ontology 106.

At block 310, the class-similarity determination module 132 may compute class similarity by comparing each source class-C in the source ontology 104 with each target class-D in the target ontology 106 to determine similarity between the two classes. As described above, this may be done by comparing each source category hierarchy tree-$T_i$ in the source ontology alignment forest-$F_C$ for the source class-C with each target category hierarchy tree-$T_j$ in the target ontology alignment forest-$F_D$ for the target class-D (e.g. $T_i \in F_C$ with each $T_j \in F_D$). For each source category hierarchy tree-$T_i$, the module 132 may determine any overlap with the target category hierarchy tree-$T_j$. The module 132 may compute the overlap between two trees-$T_i$ or $T_j$, and hence the similarity of their corresponding classes using Equation (1) as specified above. For Equation (1), by taking the exponentiation of the inverse depth of a common node, less importance may be given to a generic node, and the log of the tree size may minimize bias against large trees. Based on Equation (1), the module 132 may generate an Overlap ($T_i$, $T_j$) score between 0.0 to 1.0, where 0.0 indicates no similarity and 1.0 indicates maximum similarity.

At block 312, the contextual-similarity determination module 134 may compute contextual similarity to further determine if the source class-C should be aligned with the target class-D. As described above, the contextual similarity may be computed based on the superclasses of classes-C and D from their respective ontologies. If these superclasses are similar, then the alignment between classes-C and D is further supported and hence given more preference. Alternatively, if these superclasses are dissimilar, then the alignment between classes-C and D is penalized. In order to determine contextual similarity, for each tree pair ($T_i$, $T_j$) for the trees-$T_i$ and $T_j$, between the classes-C and D, the module 134 may determine the number of superclasses in the source and target class superclasses N(C) and N(D) that are supported by the trees-$T_i$ and $T_j$, respectively. A superclass $c \in N(C)$ may be considered supported by tree-$T_i$ if either the name of c matches a node in the tree-$T_i$, or the knowledge source article (or article category) corresponding to c—based on a knowledge source search web service call using the name of c—matches a node in $T_i$. Similarly, a superclass $d \in N(D)$ may be considered supported by tree-$T_j$ if either of the foregoing conditions are satisfied. The module 134 may compute the overall contextual similarity between the classes-C and D with respect to the trees-$T_i$ and $T_j$ using Equation (2) as described above.

At block 314, the alignment module 136 may compute overall similarity between the source class-C and the target class-D with respect to the trees-$T_i$ and $T_j$. The overall similarity may be computed by taking the weighted average of the class and contextual similarity (described above), and using Equation (3) as described above.

At block 316, the alignment module 136 may establish a link between the source class-C and the target class-D by selecting the tree pair ($T_i$, $T_j$)$\in F_C \times F_D$ with the highest overall similarity score and establishing the link if this score is greater than the alignment threshold $H_A$. The classes are aligned if a link is established between the classes. The module 136 may determine the type of link by evaluating if $O(T_i, T_j)=O(T_j, T_i)$, $O(T_i, T_j)<O(T_j, T_i)$, or if $O(T_i, T_j)>O(T_j, T_i)$. Based on these evaluations, the module 136 may respectively conclude if the source class-C and the target class-D are the same, the source class-C is a subclass of the target class-D, or the source class-C is a superclass of the target class-D.

At block 318, the system 100 may display the results of the source and target ontology alignment at alignment output 110 (see also output 238 of FIG. 5). The output 110 may output the score for overall similarity for any class link to allow a user to compare the overall score to the alignment threshold $H_A$. The threshold adjustment module 138 and the system 100 may also allow the user to initiate training by manual modification of any of the alignments, or by adjusting the alignment threshold $H_A$ for any missing or otherwise incorrect links.

4. Computer Readable Medium

Figure 7:
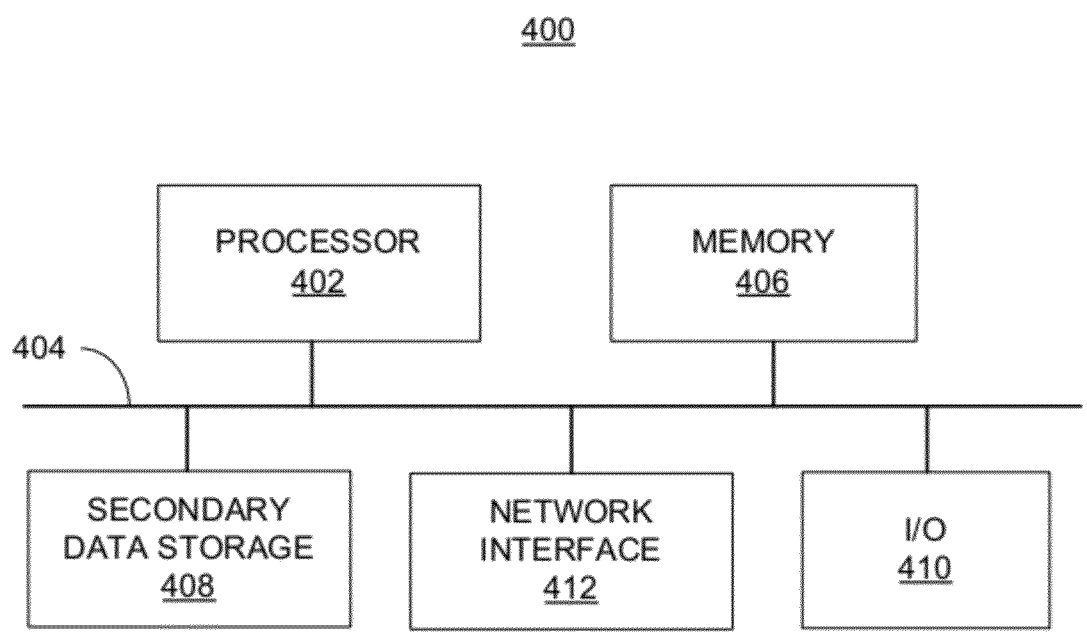
FIG. 7 illustrates a computer system, according to an embodiment.

FIG. 7 shows a computer system 400 that may be used with the embodiments described herein. The computer system 400 represents a generic platform that includes components that may be in a server or another computer system. The computer system 400 may be used as a platform for the information source alignment system 100. The computer system 400 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine readable instructions performing some or all of the methods, functions and other processes described herein. Commands and data from the processor 402 are communicated over a communication bus 404. The computer system 400 also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums.

The computer system 400 may include an I/O device 410, such as a keyboard, a mouse, a display, etc. The computer system 400 may include a network interface 412 for connecting to a network. Other known electronic components may be added or substituted in the computer system 400.

While the embodiments have been described with reference to examples, various modifications to the described embodiments may be made without departing from the scope of the claimed embodiments.

What is claimed is:

1. An information source alignment system comprising:
    a processor coupled to a memory;
    a tree generation module to generate a source category hierarchy tree for a source class in a first information source and a target category hierarchy tree for a target class in a second information source, wherein the source and target category hierarchy trees are constructed from a class hierarchy of a knowledge source;
    a class-similarity determination module comparing the source and target category hierarchy trees;
    a contextual-similarity determination module determining a similarity between superclasses of the source and target classes, the superclasses being ascertained from the respective first and second information sources; and
    an alignment module determining whether the source and target classes are aligned based on the comparison of the source and target category hierarchy trees, and based on the determined similarity,
    wherein the contextual-similarity determination module determines a number of superclasses of the source and target classes that are supported by the source and target category hierarchy trees, and
    wherein the class-similarity determination module identifies common nodes between the source and target category hierarchy trees for calculating a class-similarity value based on the category hierarchy tree comparison.

2. The system of claim 1, wherein the alignment module aligns the source and target classes if the calculated class-similarity value based on the category hierarchy tree comparison and a calculated contextual-similarity value based on the determined similarity exceed a predetermined overall-similarity threshold.

3. The system of claim 2, wherein the predetermined overall-similarity threshold is adjustable.

4. The system of claim 1, wherein the first and second information sources are respectively source and target ontologies.

5. The system of claim 1, wherein the first and second information sources are respectively source and target databases.

6. The system of claim 1, wherein the alignment module determines whether the source class is a superclass or subclass of the target class.

7. The system of claim 1, wherein a weight of a generic node for the source or target category hierarchy tree is reduced by taking an exponentiation of an inverse depth of a common node between the source and target category hierarchy trees.

8. The system of claim 1, wherein the class-similarity determination module accounts for a size of the source or target category hierarchy tree by respectively taking a log of the source or target category hierarchy tree size.

9. The system of claim 1, wherein the system permits training of the system based on previously determined source and target class alignment.

10. The system of claim 1, wherein a superclass is a class with at least one subclass that is a child to the superclass.

11. The system of claim 1, wherein the alignment module determines that the source class is a subclass of the target class if an overall similarity ($O(T_i,T_j)$) of a tree pair including the source category hierarchy tree ($T_i$) and the target category hierarchy tree ($T_j$) is less than an overall similarity ($O(T_j,T_i)$) of a tree pair including the target category hierarchy tree ($T_j$) and the source category hierarchy tree ($T_i$).

12. The system of claim 1, wherein the alignment module determines that the source class is a superclass of the target class if an overall similarity ($O(T_i,T_j)$) of a tree pair including the source category hierarchy tree ($T_i$) and the target category hierarchy tree ($T_j$) is greater than an overall similarity ($O(T_j, T_i)$) of a tree pair including the target category hierarchy tree ($T_j$) and the source category hierarchy tree ($T_i$).

13. A method for information source alignment, the method comprising:
    generating, by a computer, a source category hierarchy tree for a source class in a first information source and a target category hierarchy tree for a target class in a second information source, wherein the source and target category hierarchy trees are constructed from a class hierarchy of a knowledge source;
    determining a similarity between the source and target classes by comparing the source and target category hierarchy trees, and identifying common nodes between the source and target category hierarchy trees for calculating a class-similarity value based on the category hierarchy tree comparison;
    determining contextual similarity between the source and target classes by determining a similarity between superclasses of the source and target classes, the superclasses being ascertained from the respective first and second information sources, and determining a number of superclasses of the source and target classes that are supported by the source and target category hierarchy trees; and
    determining an alignment between the source and target classes based on the comparison of the source and target category hierarchy trees, and based on the determined contextual similarity.

14. The method of claim 13, further comprising aligning the source and target classes if a calculated class-similarity value based on the category hierarchy tree comparison and a calculated contextual-similarity value based on the determined contextual similarity exceed a predetermined overall-similarity threshold.

15. The method of claim 13, wherein the first and second information sources are respectively source and target ontologies.

16. The method of claim 13, wherein the first and second information sources are respectively source and target databases.

17. A non-transitory computer readable medium having stored thereon a computer executable program to perform information source alignment, the computer executable program when executed causes a computer system to:
    generate, by a computer, a source category hierarchy tree for a source class in a first information source and a target category hierarchy tree for a target class in a second information source, wherein the source and target category hierarchy trees are constructed from a class hierarchy of a knowledge source;
    determine a similarity between the source and target classes by comparing the source and target category hierarchy trees, and identifying common nodes between the source and target category hierarchy trees for calculating a class-similarity value based on the category hierarchy tree comparison;

determine contextual similarity between the source and target classes by determining a similarity between superclasses of the source and target classes, the superclasses being ascertained from the respective first and second information sources, and determining a number of superclasses of the source and target classes that are supported by the source and target category hierarchy trees; and determine an alignment between the source and target classes based on the comparison of the source and target category hierarchy trees, and based on the determined contextual similarity.

* * * * *